(12) United States Patent
Lin

(10) Patent No.: US 8,997,831 B2
(45) Date of Patent: Apr. 7, 2015

(54) SUNSHADE ASSEMBLY

(75) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 448 days.

(21) Appl. No.: 13/357,200

(22) Filed: Jan. 24, 2012

(65) Prior Publication Data

US 2012/0193045 A1 Aug. 2, 2012

(30) Foreign Application Priority Data

Feb. 1, 2011 (TW) .............................. 100103928 A

(51) Int. Cl.
*B60J 7/00* (2006.01)
*E06B 9/58* (2006.01)

(52) U.S. Cl.
CPC . *B60J 7/0015* (2013.01); *E06B 9/58* (2013.01)

(58) Field of Classification Search
CPC ....... E06B 9/17046; E06B 9/58; E06B 9/581; E06B 9/582; B60J 7/0007; B60J 7/0015; B60J 3/02; B60J 3/002; B60J 3/005
USPC ............ 160/266–272, 370.22; 296/214, 97.8, 296/98; 493/446
See application file for complete search history.

(56) References Cited

U.S. PATENT DOCUMENTS

| 5,807,228 | A  | * | 9/1998 | Smithe et al. .................. 493/438 |
| 6,179,373 | B1 | * | 1/2001 | Bohm et al. ................... 296/214 |
| 7,793,702 | B2 | * | 9/2010 | Biewer et al. ............. 160/370.22 |
| 2010/0032992 | A1 | * | 2/2010 | Keller ....................... 296/216.01 |
| 2010/0170645 | A1 | * | 7/2010 | Lin ............................... 160/370 |
| 2012/0098301 | A1 | * | 4/2012 | Nakamura et al. ............ 296/219 |

* cited by examiner

*Primary Examiner* — Katherine Mitchell
*Assistant Examiner* — Jeremy Ramsey
(74) *Attorney, Agent, or Firm* — Whyte Hirschboeck Dudek S.C.

(57) ABSTRACT

A sunshade assembly includes two rail seats, a shade member and a guide unit. The shade member has a main portion and two foldable portions connected respectively to left and right sides of the main portion. The guide unit includes two guide members mounted respectively to the rail seats. Each guide member has a guide groove for receiving a portion of a respective one of the foldable portions of the shade member, and a guide surface formed in the guide groove. When the shade member is unwound, the foldable portions pass through the guide grooves and are urged to be folded through guidance of the guide surfaces before entering and being confined in the rail seats.

3 Claims, 10 Drawing Sheets

SUNSHADE ASSEMBLY

CROSS-REFERENCE TO RELATED APPLICATION

This application claims priority of Taiwanese Application No. 100103928, filed on Feb. 1, 2011.

BACKGROUND OF THE INVENTION

1. Field of the Invention

The invention relates to a sunshade assembly, more particularly to a sunshade assembly including a shade member that can be stretched and retracted along a pair of rail seats.

2. Description of the Related Art

As shown in FIGS. 1 and 2, a conventional sunshade assembly 1 is adapted to be mounted under a sunroof of an automobile (not shown). The conventional sunshade assembly 1 includes a pair of rail seats 11 (only one is shown) that are spaced apart from each other in a left-right direction, a shade member 12 that is wound on a spool (not shown) and that has a free end 121, an end bar 13 that extends in the left-right direction and that is coupled to the free end 121 of the shade member 12, and a pair of end members 14 (only one is shown) that are secured respectively to opposite ends of the end bar 13. Each of the rail seats 11 is formed with a shade groove 111 opening toward the opposite one of the rail seats 11, and a slide groove 112 engaged slidably with a respective one of the end members 14.

The shade member 12 has a pair of foldable end portions 122 (only one is shown) spaced apart from each other in the left-right direction. Each of the foldable end portions 122 is folded to be a lying V-shaped portion retained slidably in the shade groove 111 of the respective one of the rail seats 11, thereby preventing the shade member 12 from being separated from the rail seats 11 during winding or unwinding movement.

SUMMARY OF THE INVENTION

The object of the present invention is to provide a sunshade assembly including a shade member that has opposite end portions which can easily be folded to be engaged firmly and respectively with two rail seats during winding or unwinding action of the shade member.

Accordingly, a sunshade assembly of the present invention comprises a pair of rail seats, a stationary seat, a shade unit and a guide unit. The rail seats are spaced apart from each other in a left-right direction. Each of the rail seats is formed with a shade groove that extends in a front-rear direction and that opens toward the opposite one of the rail seats. The stationary seat extends in the left-right direction and has opposite ends that are adjacent to and located behind the rail seats, respectively. The shade unit includes a shade member that is releasably wound in the stationary seat and that has a main portion, a pair of foldable portions and an accessible distal edge. The main portion has opposite sides in the left-right direction. The foldable portions are connected respectively to the opposite sides of the main portion. Each of the foldable portions has a connecting sector that extends integrally from a respective one of the opposite sides of the main portion, and a foldable sector that extends from an end of the connecting sector opposite to the main portion in the left-right direction. The accessible distal edge extends in the left-right direction. The shade unit further includes an end bar that is connected to the accessible distal edge of the shade member, that has opposite ends adjacent respectively to the rail seats, and that is movable in the front-rear direction. The guide unit includes a pair of guide members that are mounted respectively to the rail seats at positions adjacent to the stationary seat. Each of the guide members has a guide groove that is configured for receiving a portion of a respective one of the foldable portions of the shade member, and a guide surface that is formed in the guide groove. When the end bar of the shade member is pulled in the front-rear direction away from the stationary seat, each of the foldable portions of the shade member passes through the guide groove of a respective one of the guide members and is urged to be folded through guidance of the guide surface to thereby move the foldable sector to be over the connecting sector before entering and being confined in the shade groove of a respective one of the rail seats.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
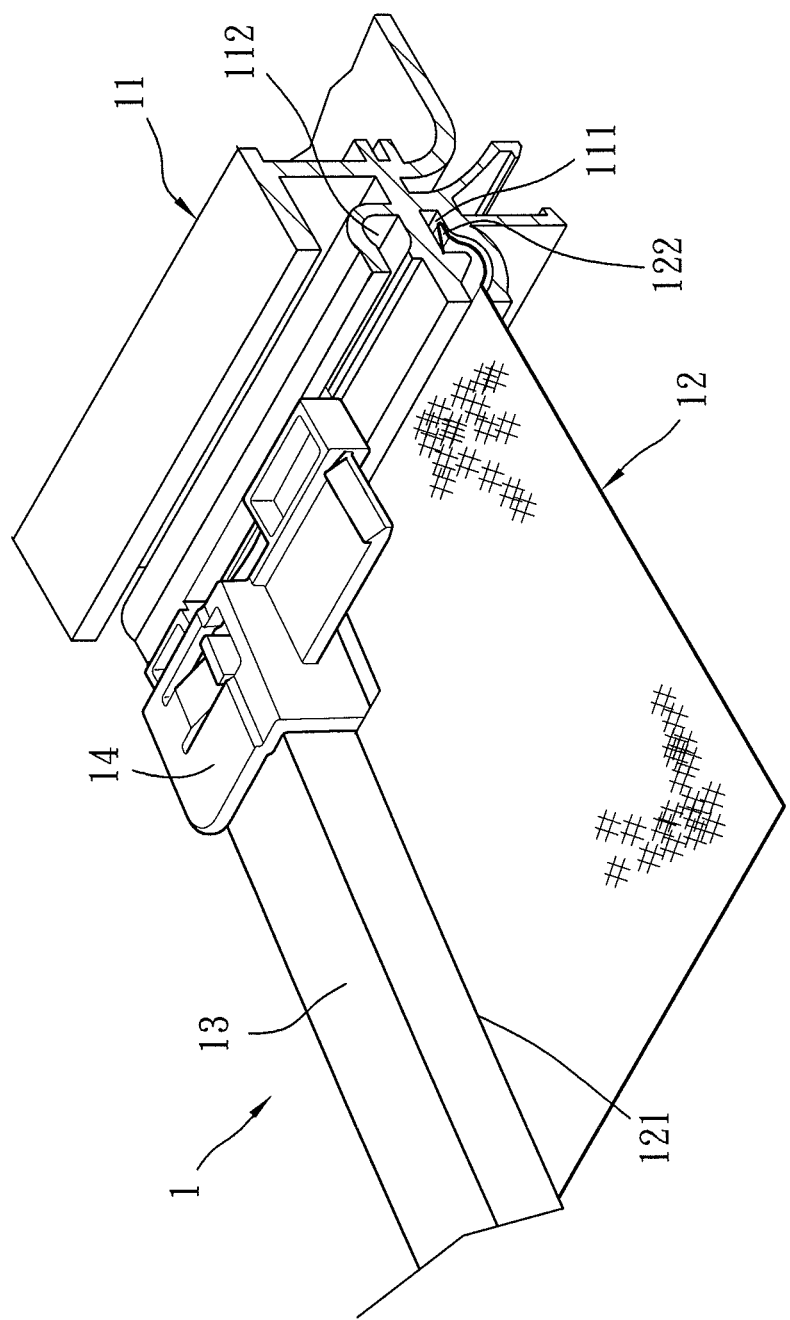
FIG. 1 is a fragmentary perspective view of a conventional sunshade assembly.
Figure 2:
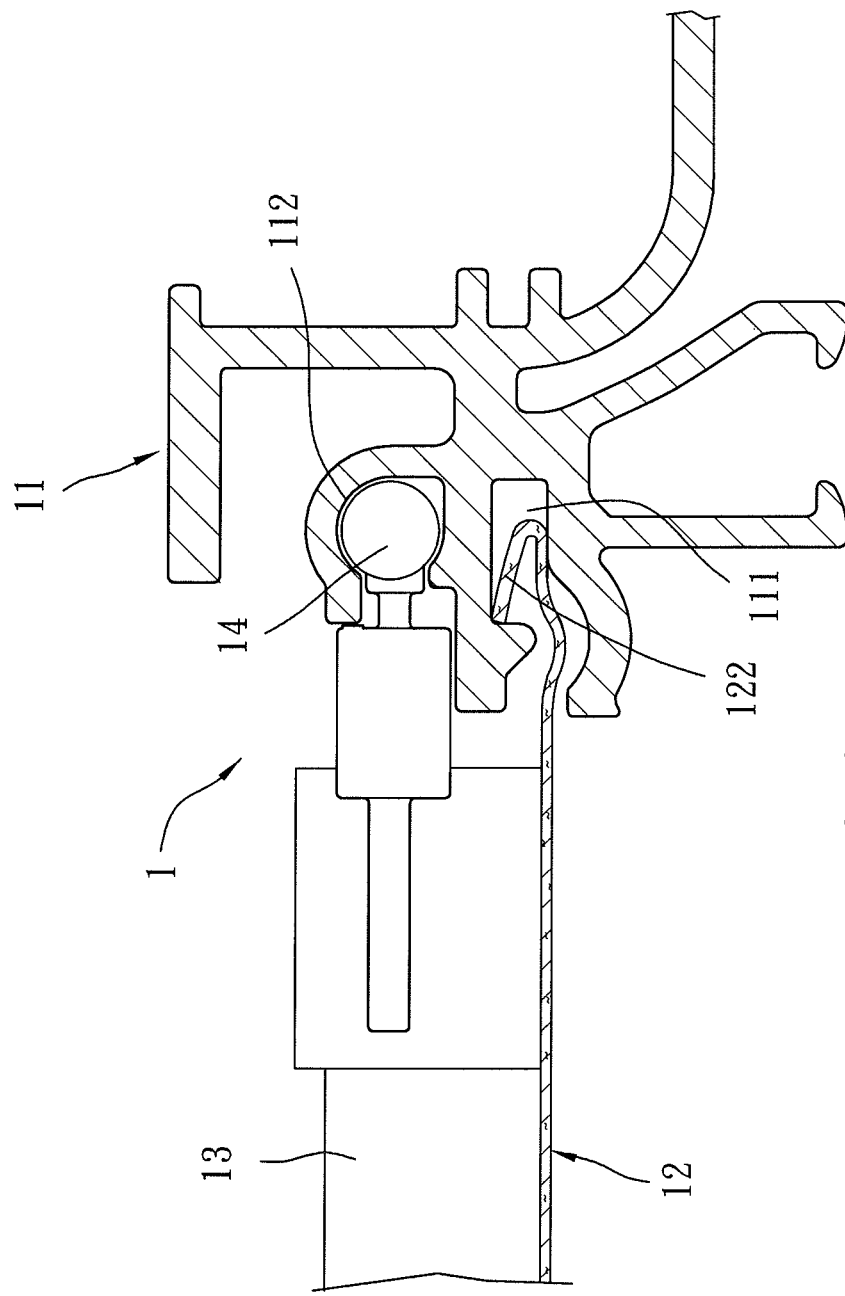
FIG. 2 is a fragmentary sectional view of the conventional sunshade assembly.

Before the present invention is described in greater detail, it should be noted that like elements are denoted by the same reference numerals throughout the disclosure.

Figure 3:
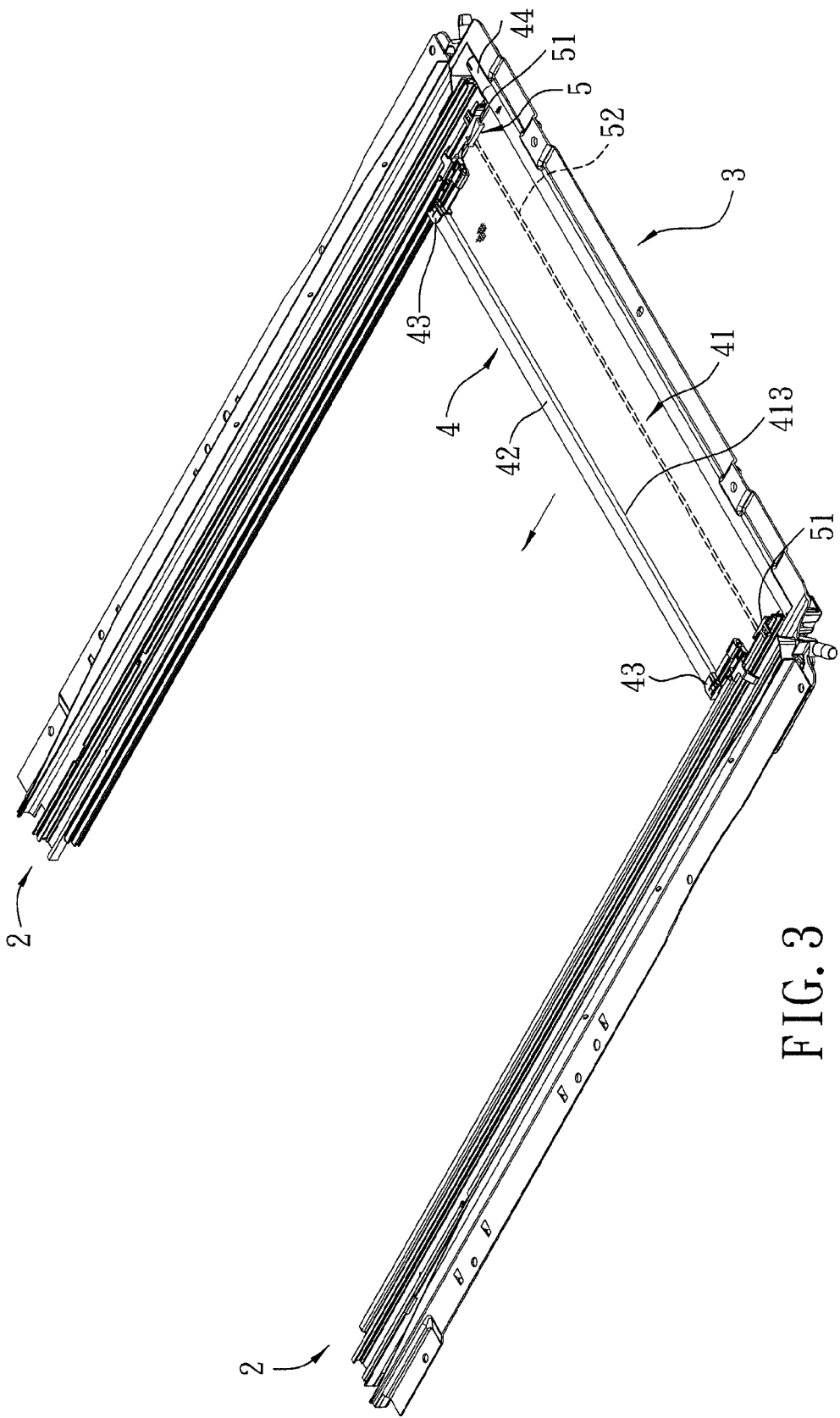
FIG. 3 is a perspective view of a first preferred embodiment of a sunshade assembly according to the invention.
Figure 4:
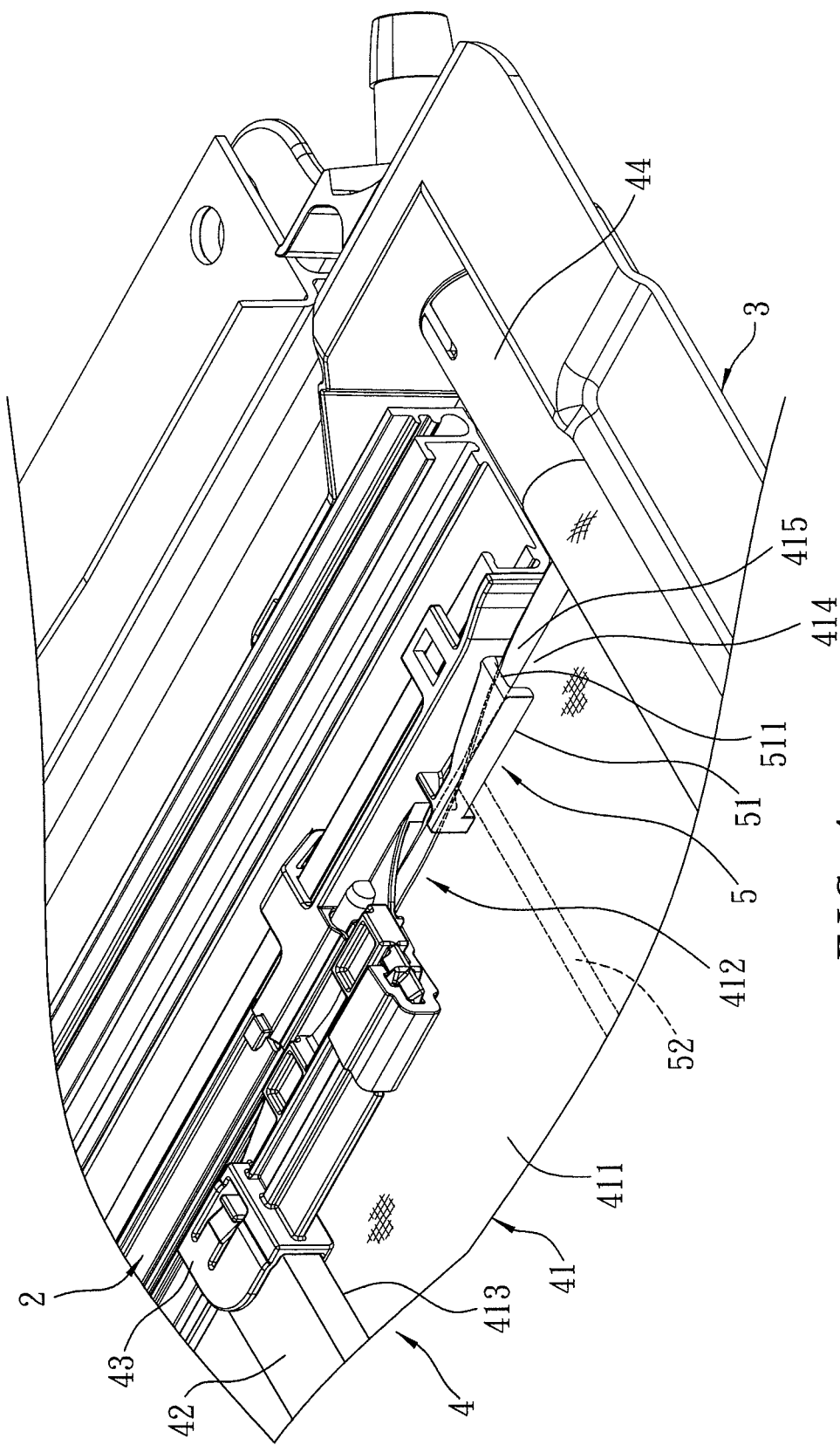
FIG. 4 is a fragmentary perspective view of the first preferred embodiment.
Figure 5:
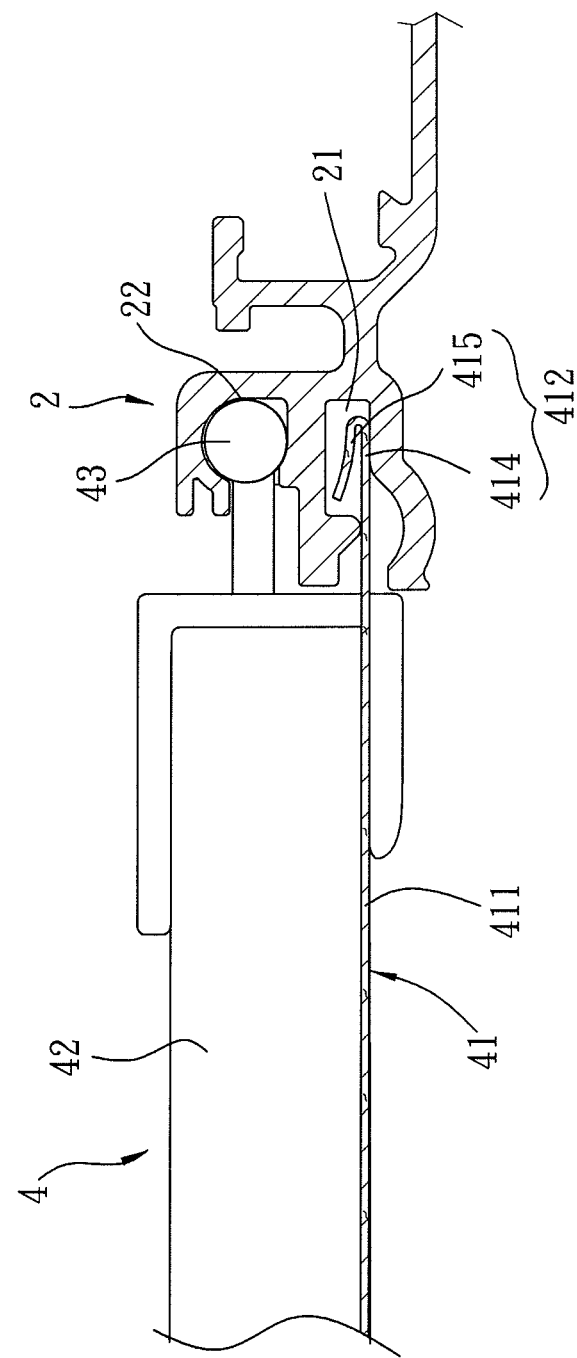
FIG. 5 is a fragmentary sectional view of the first preferred embodiment.

As shown in FIGS. 3 to 5, the first preferred embodiment of a sunshade assembly according to the present invention is adapted to be coupled to a roof of an automobile (not shown) and disposed under a sunroof (not shown). The sunshade assembly comprises a pair of rail seats 2, a stationary seat 3, a shade unit 4 and a guide unit 5.

The rail seats 2 are spaced apart from each other in a left-right direction and are mounted to a bottom surface of the roof at left and right sides of the sunroof. Each of the rail seats 2 is formed with a shade groove 21 that extends in a front-rear direction and that opens toward the opposite one of the rail seats 2, and a slide groove 22 that extends in the front-rear direction, that opens toward the opposite one of the rail seats 2, and that is disposed over the shade groove 21.

The stationary seat 3 is mounted at a rear side of the sunroof, extends in the left-right direction and has opposite ends that are respectively adjacent to and located behind the rail seats 2.

The shade unit 4 includes a shade member 41, a spool 44, an end bar 42 and a pair of end members 43.

The shade member 41 is releasably wound on the spool 44 and is disposed in the stationary seat 3. The shade member 41 has a main portion 411 that has opposite sides in the left-right direction, a pair of foldable portions 412 that are connected respectively to the opposite sides of the main portion 411, and an accessible distal edge 413 that extends in the left-right direction. Each of the foldable portions 412 has a connecting sector 414 that extends integrally from a respective one of the opposite sides of the main portion 411, and a foldable sector 415 that extends from an end of the connecting sector 414 opposite to the main portion 411 in the left-right direction. The end bar 42 is connected to the accessible distal edge 413 of the shade member 41, has opposite ends adjacent respectively to the rail seats 2, and is movable in the front-rear direction. The end members 43 are secured respectively to the opposite ends of the end bar 42, and are retained slidably and respectively in the slide grooves 22 of the rail seats 2. The shade unit 4 further includes a spring (not shown) disposed in the stationary seat 3 for biasing the spool 44 to rotate for retracting the shade member 42. Since the configuration of the combination of the spool 44 and the spring is known in the art, further details of the same are omitted herein for the sake of brevity.

Figure 6:
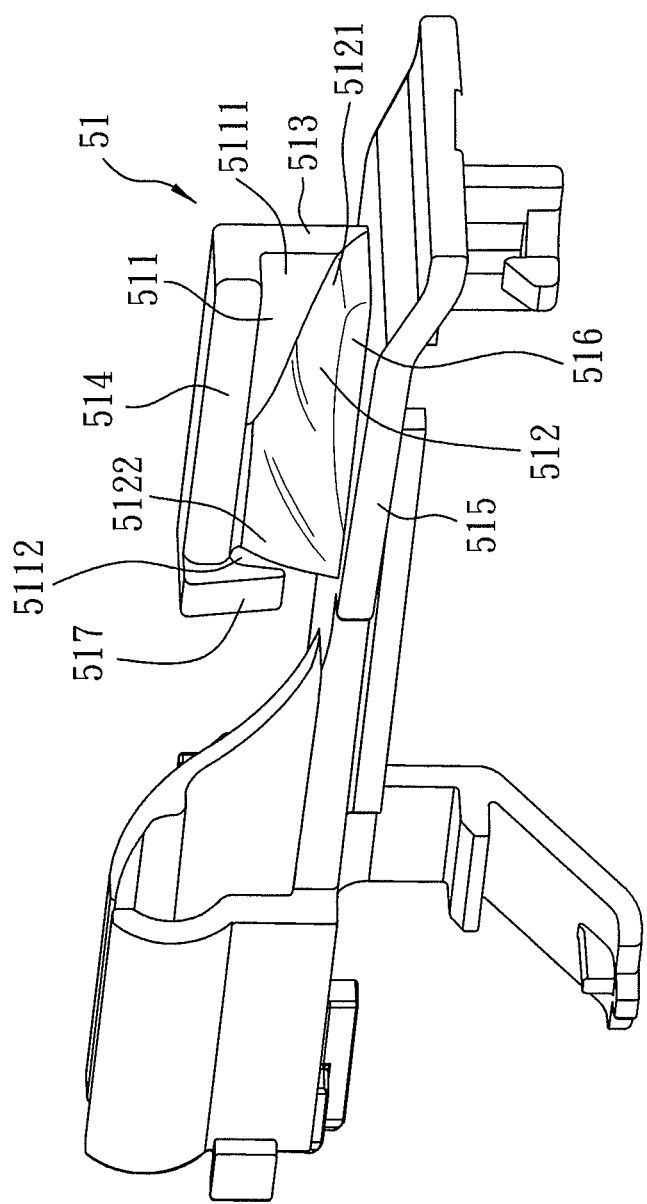
FIG. 6 is a perspective view of a guide unit of the first preferred embodiment.
Figure 7:
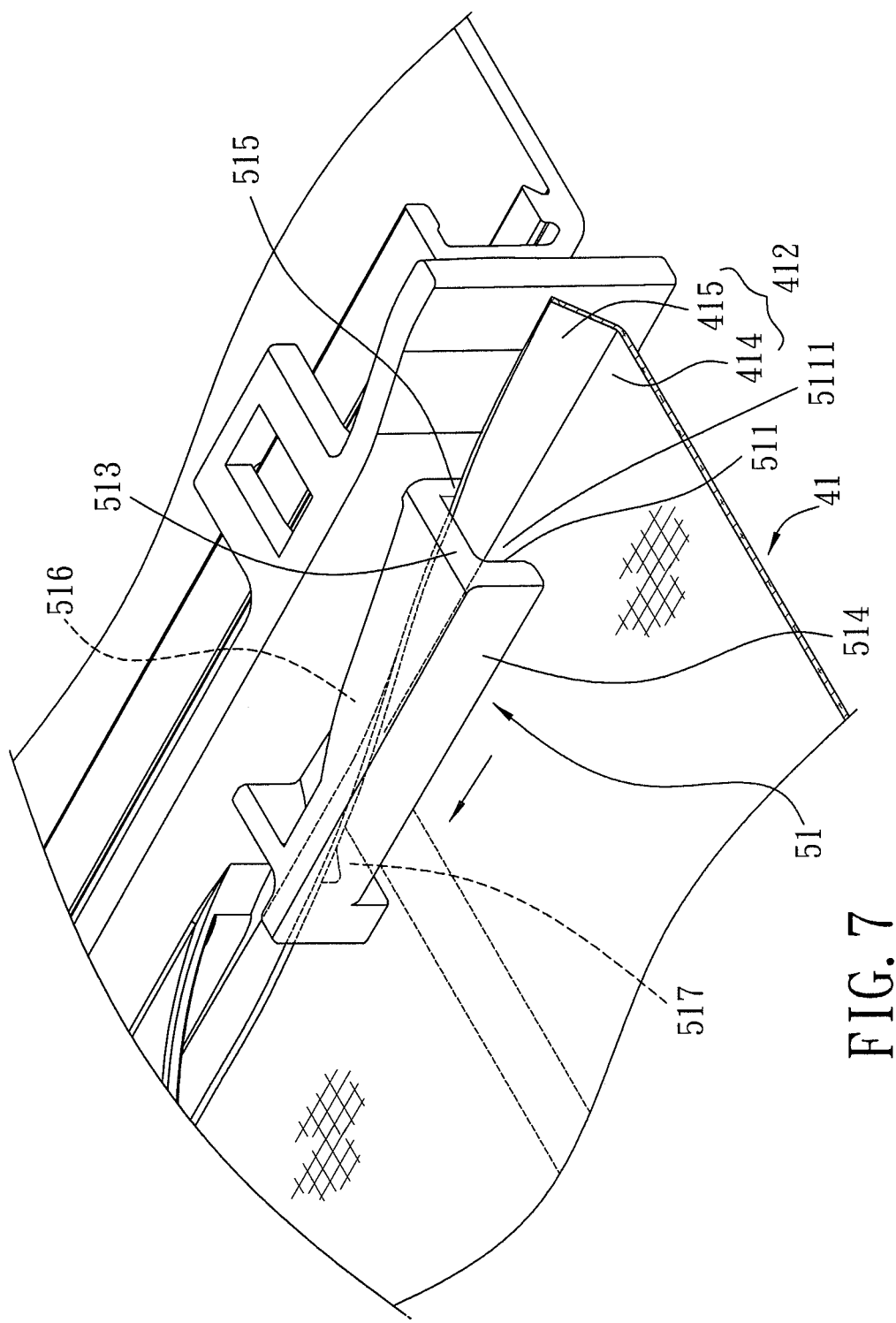
FIG. 7 is a fragmentary perspective view of a shade member and the guide unit of the first preferred embodiment.
Figure 8:
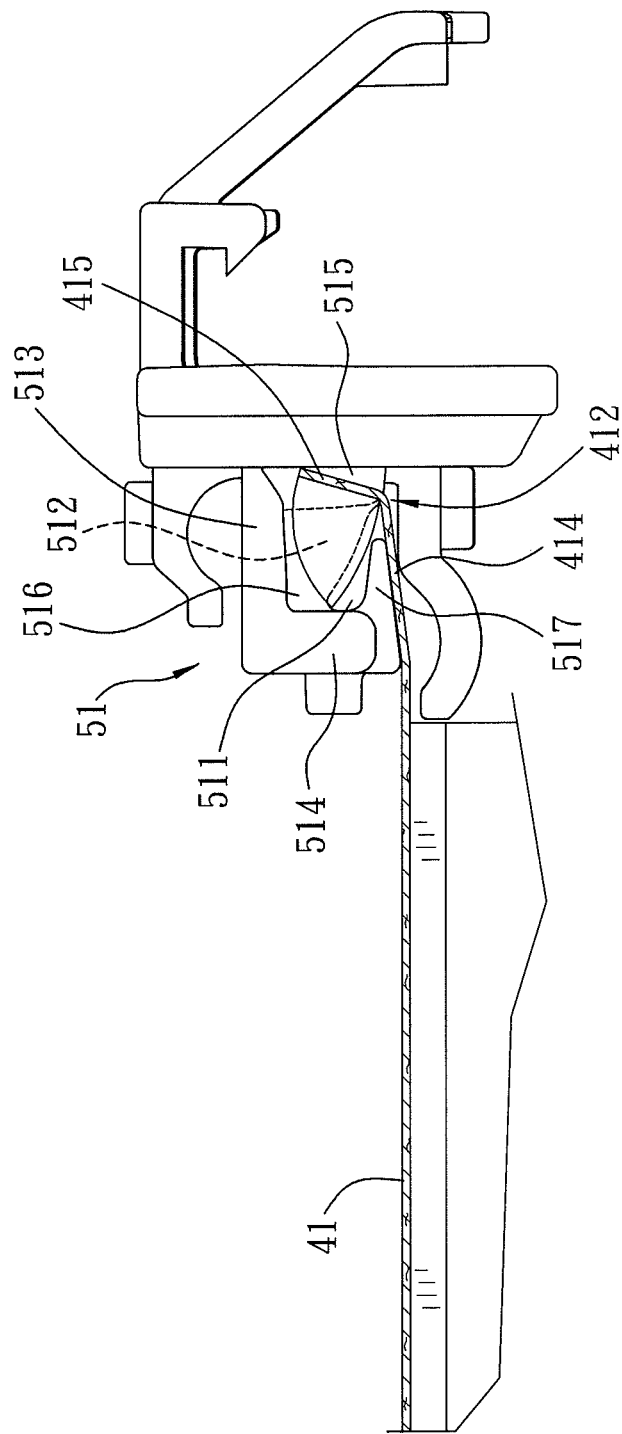
FIG. 8 is another fragmentary sectional view of the first preferred embodiment, illustrating how a foldable portion of the shade member is folded by the guide unit.

The guide unit 5 includes a pair of guide members 51. Each of the guide members 51 is mounted to a rear portion of a respective one of the rail seats 2 adjacent to the stationary seat 3. Referring to FIGS. 6 to 8, each of the guide members 51 has a top wall 513 having inner and outer edges that are opposite to each other in the left-right direction, an inner side wall 514 extending downwardly from the inner edge of the top wall 513, and an outer side wall 515 extending downwardly from the outer edge of the top wall 513 and cooperating with the top wall 513 and the inner side wall 514 to define a guide groove 511 for receiving a portion of a respective one of the foldable portions 412 of the shade member 41. Each guide member 51 further includes a guide block 516 disposed in the guide groove 511, connected to the top wall 513 and the outer side wall 515, and formed with a twisted guide surface 512. The guide surface 512 has a rear end portion 5121 proximate to the stationary seat 3 and facing the outer side wall 515, and a front end portion 5122 distal from the stationary seat 3 and facing downwardly. As such, the guide groove 511 of each guide member 51 has a large open end 5111 that is proximate to the stationary seat 3, and a small open end 5112 that is distal from the stationary seat 3 and that is smaller than the large open end 5112. Each guide member 51 further has a pressing block 517 extending from a front end of a bottom edge of the inner side wall 514 toward the outer side wall 515.

The guide unit 5 further includes a support bar 52 having opposite end portions that are spaced-apart from each other in the left-right direction and that are disposed respectively below the pressing blocks 517.

Figure 9:
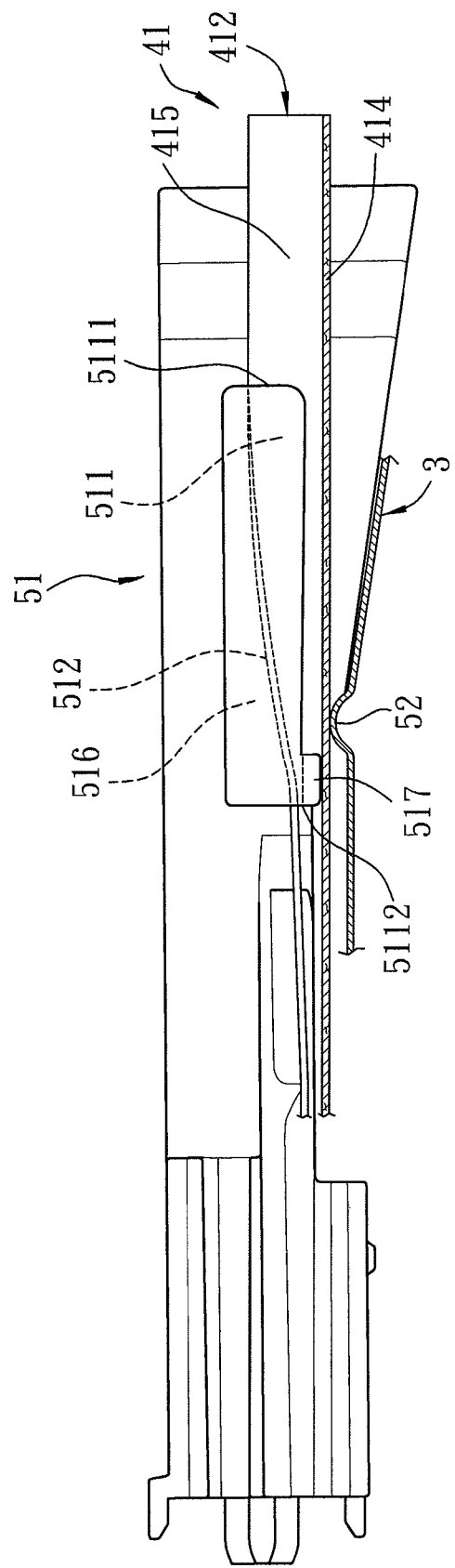
FIG. 9 is still another fragmentary sectional view of the first preferred embodiment, illustrating a support bar that supports the shade member thereon.

In use, when the end bar 42 of the shade unit 4 is pulled in the front-rear direction away from the stationary seat 3 to unwind the shade member 41, each of the foldable portions 412 of the shade member 41 passes through the guide groove 411 of a respective one of the guide members 51 and is urged to be folded through guidance of the guide surface 512, so that the foldable sector 415 thereof is moved to be over the connecting sector 414 before entering and being confined in the shade groove 21 of a respective one of the rail seats 2. For each guide member 51, referring further to FIG. 9, the pressing block 517 is disposed between the connecting sector 414 and the foldable sector 415 of a corresponding one of the foldable portions 412 of the shade member 41 and presses downwardly the connecting sector 414 after the folding of the corresponding one of the foldable portions 412 while the main portion 411 of the shade member 41 is supported from the bottom thereof by the support bar 52, so that completion of the abovementioned folding process can be ensured.

Referring back to FIG. 5, each foldable portion 412 of the shade member 41 is in a V-shaped form when being automatically folded and confined slidably in the corresponding shade groove 21, thereby stretching the main portion 411 of the shade member 41 in the left-right direction during the winding and unwinding movements of the shade member 41, so that separation of the shade member 41 from the shade grooves 21 of the rail seats 2 can be avoided.

Figure 10:
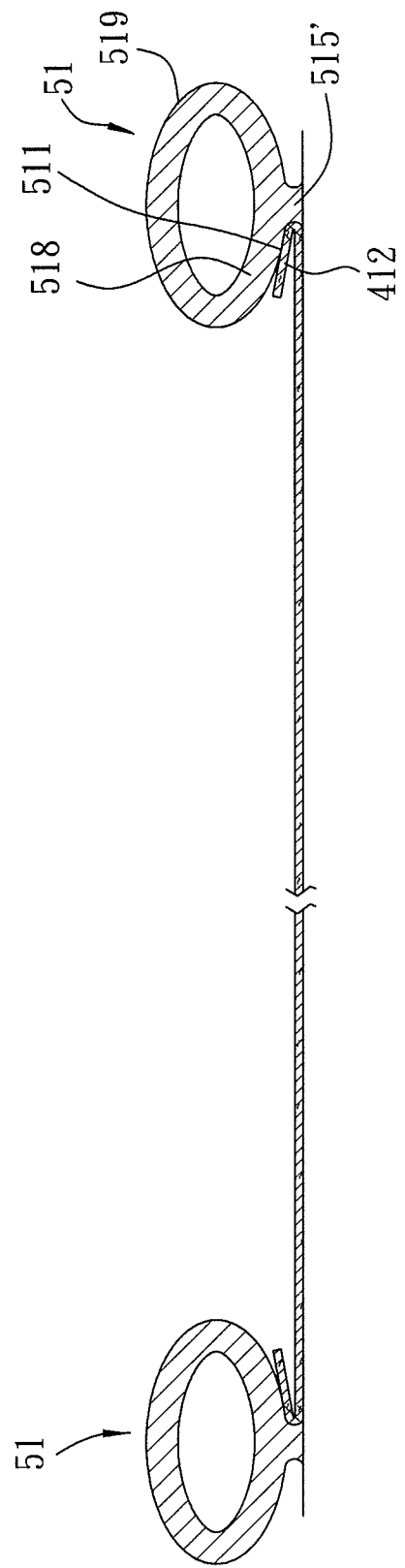
FIG. 10 is a fragmentary sectional view of a second preferred embodiment of the sunshade assembly according to the invention.

As shown in FIG. 10, the second preferred embodiment of the sunshade assembly according to the present invention has a structure similar to that of the first embodiment. The main difference between this embodiment and the previous embodiment resides in the guide members 51. In this embodiment, each of the guide members 51 includes an upright side wall segment 515', and a tubular wall 519 connected to a top edge of the upright side wall segment 515' and having a concave wall segment 518 that extends from the top edge of the upright side wall segment 515' toward the opposite one of the guide members 51. The concave wall segment 518 of the tubular wall 519 cooperates with the upright side wall segment 515' to define the guide groove 511 therebetween. The second preferred embodiment has the same advantages as those of the first preferred embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A sunshade assembly comprising:
a pair of rail seats spaced apart from each other in a left-right direction, each of said rail seats being formed with a shade groove that extends in a front-rear direction and that opens toward an opposite one of said rail seats;
a stationary seat extending in the left-right direction and having opposite ends that are adjacent to and located behind said rail seats, respectively;
a shade unit including
a shade member that is releasably wound in said stationary seat and that has
a main portion having opposite sides in the left-right direction,
a pair of foldable portions connected respectively to said opposite sides of said main portion, each of said foldable portions having a connecting sector that extends integrally from a respective one of said opposite sides of said main portion, and a foldable sector that extends from an end of said connecting sector opposite to said main portion in the left-right direction, and
an accessible distal edge extending in the left-right direction, and
an end bar that is connected to said accessible distal edge of said shade member, that has opposite ends adjacent respectively to said rail seats, and that is movable in the front-rear direction; and a guide unit including a pair of guide members that are mounted respectively to said rail seats at positions adjacent to said stationary seat, each of said guide members having
a guide groove that is configured for receiving a portion of a respective one of said foldable portions of said shade member, and
a guide surface that is formed in said guide groove;
wherein, when said end bar of said shade unit is pulled in the front-rear direction away from said stationary seat, each of said foldable portions of said shade member passes through said guide groove of a respective one of said guide members and is urged to be folded through guidance of said guide surface to thereby move said foldable sector to be over said connecting sector before entering and being confined in said shade groove of a respective one of said rail seats;
wherein each of said guide members has
a top wall having inner and outer edges that are opposite to each other in the left-right direction,
an inner side wall extending downwardly from said inner edge of said top wall,
an outer side wall extending downwardly from said outer edge of said top wall and cooperating with said top wall and said inner side wall to define said guide groove thereamong, and
a guide block disposed in said guide groove, connected to said top wall and said outer side wall, and formed with said guide surface that is twisted and that has a rear end portion facing said outer side wall and a front end portion facing downwardly, said guide groove of each of said guide members having a large open end that is proximate to said stationary seat, and a small open end that is distal from said stationary seat and that is smaller than said large open end; and
wherein each of said guide members further has a pressing block attached to and extending from a front end of a bottom edge of said inner side wall toward said outer side wall for being disposed between said connecting sector and said foldable sector of a respective one of said foldable portions of said shade member and pressing said connecting sector after the folding of the respective one of said foldable portions.

2. The sunshade assembly as claimed in claim 1, wherein said guide unit further includes a support bar having opposite end portions that are spaced-apart from each other in the left-right direction and that are disposed respectively below said pressing blocks of said guide members.

3. The sunshade assembly as claimed in claim 1, wherein each of said guide members has an upright side wall segment and a concave wall segment extending from a top edge of said upright side wall segment toward the opposite one of said guide members and cooperating with said upright side wall segment to define said guide groove therebetween.

\* \* \* \* \*